(12) United States Patent
Miyazaki et al.

(10) Patent No.: US 7,417,842 B2
(45) Date of Patent: Aug. 26, 2008

(54) APPARATUS FOR POWER CONVERSION IN ELECTRIC ROLLING STOCK

(75) Inventors: Akira Miyazaki, Kunitachi (JP); Takashi Hashimoto, Niiza (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

(21) Appl. No.: 11/360,682

(22) Filed: Feb. 24, 2006

(65) Prior Publication Data

US 2006/0203528 A1    Sep. 14, 2006

(30) Foreign Application Priority Data

Feb. 25, 2005    (JP) ............... 2005-050631

(51) Int. Cl.
*H02H 3/22* (2006.01)
*H02P 27/04* (2006.01)
(52) U.S. Cl. ...................... 361/111; 318/801
(58) Field of Classification Search ............ 361/111; 318/801
See application file for complete search history.

(56) References Cited

U.S. PATENT DOCUMENTS 6,028,779 A * 2/2000 Sakamoto et al. ............ 363/55
7,049,787 B2 * 5/2006 Knapp et al. ................ 318/801

FOREIGN PATENT DOCUMENTS

| JP | 2004-096832 | 3/2004 |
|---|---|---|
| JP | 2005-229708 | 8/2005 |

* cited by examiner

*Primary Examiner*—Michael J Sherry
*Assistant Examiner*—Dharti H Patel
(74) *Attorney, Agent, or Firm*—Finnegan, Henderson, Farabow, Garrett & Dunner, L.L.P.

(57) ABSTRACT

An apparatus for electric power conversion in an electric rolling stock, comprising an inverter which receives a DC power fed from a DC power source at DC terminals, converts the received DC power into an AC power, and supplies the AC power to an AC motor, a first capacitor which is connected to the DC terminals of the inverter by low inductance connection and reduces a surge voltage generated in the inverter, and a second capacitor which is connected to the DC terminals of the inverter through a fuse, wherein a total sum of capacities of the first and the second capacitors is equal to or larger than a system demand capacitance.

2 Claims, 3 Drawing Sheets

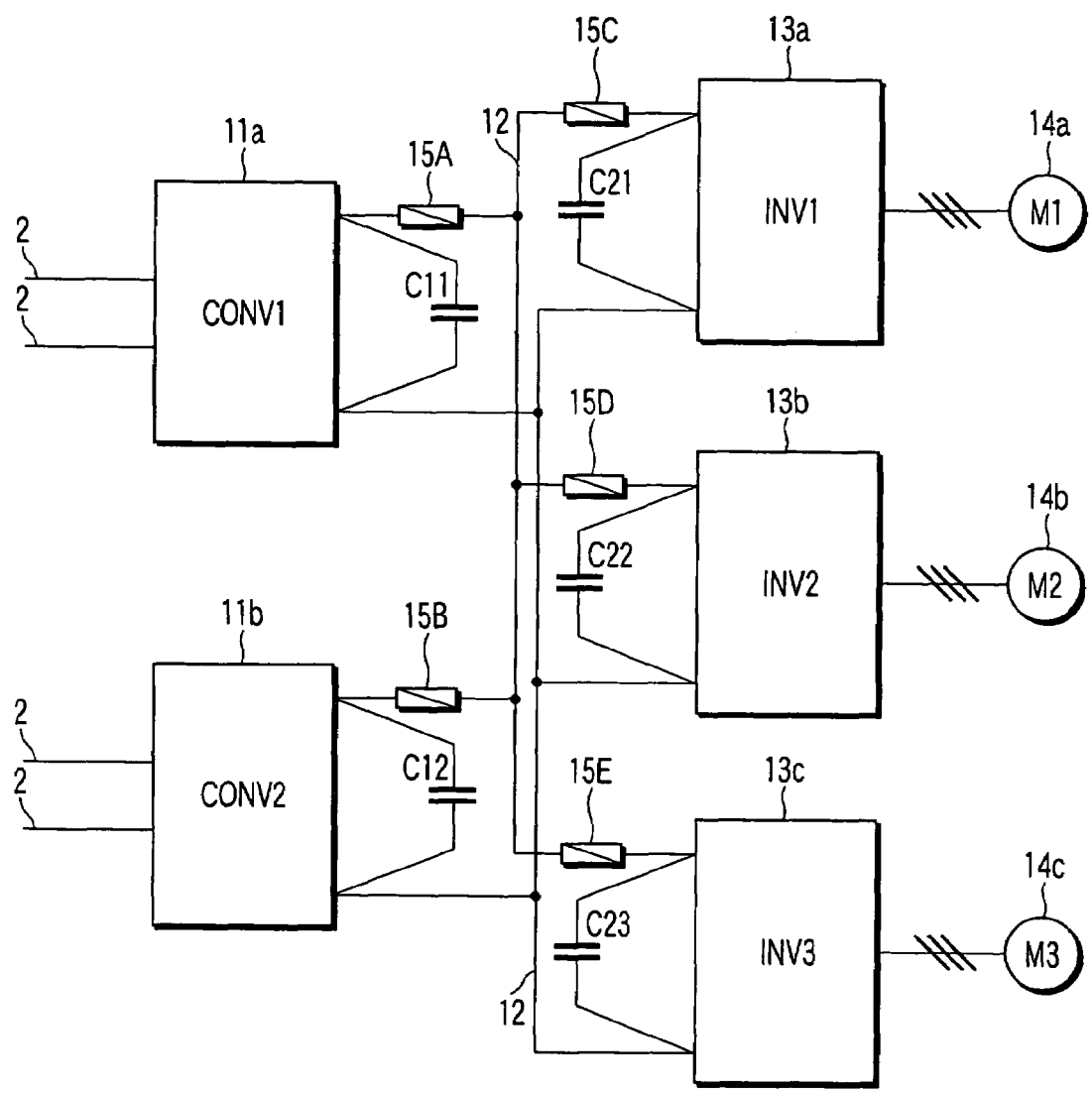
F I G. 4

APPARATUS FOR POWER CONVERSION IN ELECTRIC ROLLING STOCK

CROSS-REFERENCE TO RELATED APPLICATIONS

This application is based upon and claims the benefit of priority from prior Japanese Patent Application No. 2005-050631, filed Feb. 25, 2005, the entire contents of which are incorporated herein by reference.

BACKGROUND OF THE INVENTION

1. Field of the Invention

The present invention relates to an apparatus for electric power conversion in electric rolling stock, wherein the apparatus comprises an inverter and drives an electric motor of electric rolling stock according to an alternating-current power output from the inverter.

2. Description of the Related Art

The apparatus for electric power conversion in electric rolling stock, wherein the apparatus comprises an inverter and drives an alternating-current electric motor (AC motor) according to an alternating-current power output from the inverter. For example, when the electric power is supplied through the an alternating-current catenary (AC catenary), the apparatus for electric power conversion in electric rolling stock inputs a single-phase alternating current through the AC catenary and converts it to direct-current power (DC power). At this time, the apparatus for electric power conversion in electric rolling stock requires a large-capacitance filter capacitor to reduce a direct-current voltage ripple (DC voltage ripple). On the other hand, when the electric power is supplied through a direct-current catenary (DC catenary), the apparatus for electric power conversion in electric rolling stock requires large-capacitance filter capacitors in order to reduce a high frequency component of catenary current. With regard to the both types of filter capacitors, the required capacitance depends on the output of an applied device. Especially, the apparatus for electric power conversion in a high-power electric rolling stock such as a locomotive has filter capacitors with especially large capacitance.

On the other hand, the apparatus for electric power conversion in electric rolling stock is required to reduce surge voltage of a switching element (semiconductor element), which constitutes an electric power conversion section, at interrupting. There are two methods for reducing the surge voltage.

One method is a method in which a snubber circuit is provided in the electric power conversion section. A smaller apparatus for electric power conversion in electric rolling stock has been required in order to be installed in electric rolling stock. Thereby, the apparatus for electric power conversion in electric rolling stock preferably has a configuration without a snubber circuit in order to decrease the number of components by making the circuit of the electric power conversion section simple, and to minimize extra power consumption for better efficiency.

Thus, the second method is proposed in which a filter capacitor is connected to the electric power conversion section. The filter capacitor connected between DC terminals forms a loop circuit with a switching element included in the electric power conversion section. In this method, it is desired to connect the filter capacitor by "low inductance connection" in which the loop circuit has as low an inductance as possible. In order to realize the low inductance connection, an element which has a large inductance, such as a fuse, cannot be connected to the loop circuit.

There has been disclosed an apparatus for electric power conversion (refer to, for example, Jpn. Pat. Appln. KOKAI Publication No. 2004-96832) provided with an electric power conversion section in which a large-capacitance filter capacitor and the electric power conversion section are connected by the low inductance connection, and a snubber circuit is not provided.

However, a measure regarding damages of the apparatus for electric power conversion has not been disclosed in the above document, wherein the damages are caused by a direct-current short-circuit current generated when breakdown of a switching element in the electric power conversion section is caused.

For example, when a short-circuit is made in a switching element within the electric power conversion section by a fault, charges in the filter capacitors discharge at a fault location. At this time, degree of breakdown in the switching element becomes large, depending on electrical discharge energy. Accordingly, there is a possibility that not only a portion of the switching element is subjected to damages caused by the above fault, but also an outside housing in the electric power conversion section bursts, and peripheral devices are subjected to damages.

There has been a method by which a fuse is provided between the filter capacitor and the switching element in order to reduce flow of electrical discharge energy into the fault location. Thereby, the fuse melts while discharging to reduce flow of the electrical discharge energy into the fault location. However, the filter capacitor and the switching element cannot be connected by the low inductance connection in this method.

Accordingly, these filter capacitors preferably has as low an capacitance as possible from the viewpoint of reducing damages in the event of a fault. However, considering an original function of decreasing the DC voltage ripple, these filter capacitors are required to have a capacitance equal to or larger than a predetermined value according to applied devices and the like.

BRIEF SUMMARY OF THE INVENTION

An object of the present invention is to provide an apparatus for electric power conversion in electric rolling stock in which a filter capacitor and a semiconductor element constituting an electric power conversion section are connected by low inductance connection, and flow of electrical discharge energy into a fault location in the filter capacitor can be reduced.

An apparatus for electric power conversion in electric rolling stock, comprises an inverter which receives a DC power fed from a DC power source at DC terminals, converts the received DC power into an AC power, and supplies the AC power to an AC motor, a first capacitor which is connected to the DC terminals of the inverter by low inductance connection and reduces a surge voltage generated in the inverter, and a second capacitor which is connected to the DC terminals of the inverter through a fuse, wherein a total sum of capacities of the first and the second capacitors is equal to or larger than a system demand capacitance.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a block diagram of an apparatus for electric power conversion in electric rolling stock according to a fourth embodiment of the present invention;

DETAILED DESCRIPTION OF THE INVENTION

Hereinafter, embodiments according to the present invention will be explained with reference to drawings.

First Embodiment

Figure 1:
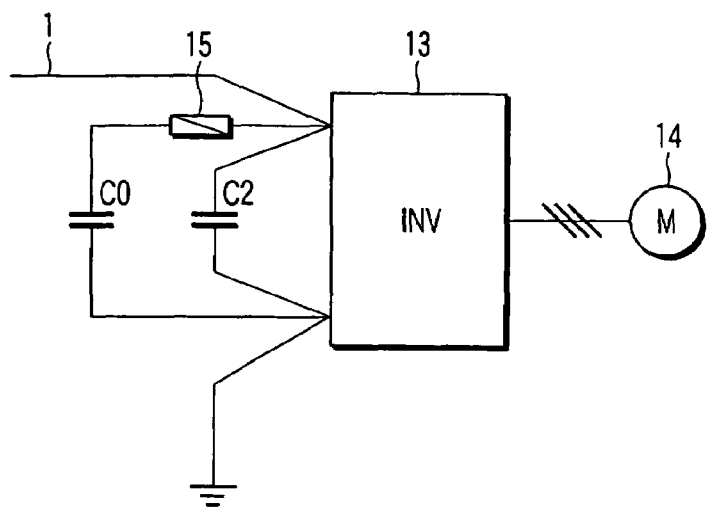
FIG. 1 is a block diagram of an apparatus for electric power conversion in electric rolling stock according to a first embodiment of the present invention.

FIG. 1 is a block diagram of an apparatus for electric power conversion in electric rolling stock according to a first embodiment of the present invention.

In the apparatus for electric power conversion in electric rolling stock according to the present embodiment, DC power fed through a DC catenary is converted into predetermined alternating-current power (AC power), and the converted power is supplied to an AC motor 14 which drives electric rolling stock.

A DC power source 1 is connected to a DC catenary through a circuit breaker and a reactor. The DC power source 1 feeds DC power to an inverter 13. Though not shown, the inverter 13 includes a switching element such as an insulated gate bipolar transistor (IGBT) and its peripheral components. The inverter 13 converts the DC power supplied from the DC power source 1 into an AC power, and the AC power is supplied to the AC motor 14 which drives the electric rolling stock. The AC motor 14 is driven and controlled by the AC power supplied from the inverter 13.

The filter capacitor C2 is connected between direct-current terminals (DC terminals) of the inverter 13 by the low inductance connection. The filter capacitor C0 is connected through a fuse 15 between the DC terminals of the inverter 13.

The filter capacitor C2 is provided in order to reduce the surge voltage at interrupting of the switching element of the inverter 13. The filter capacitor C2 has a capacitance equal to or larger than a capacitance required for reducing the surge voltage (Hereinafter, called "interrupting-characteristic demand capacitance"). The interrupting-characteristic demand capacitance is based on, for example, a maximum interrupting current, DC voltage, and restrictions by elements (the value of a breakdown voltage, and the like).

The filter capacitors C2 and C0 are provided for limiting the high frequency component of a current generated in a vehicle. The total capacitance of the filter capacitors C2 and C0 is a capacitance equal to or larger than a capacitance required for limiting the high frequency component (Hereinafter, called "system demand capacitance"). This system demand capacitance is based on, for example, the current of an electric motor, and restriction on high frequency components at the side of the DC power source 1 (permissible value). Please note that the interrupting-characteristic demand capacitance is smaller than the system demand capacitance.

A case in which the DC terminals are short-circuited by a fault in the switching element of the inverter 13 will be explained.

The filter capacitors C2 and C0 start discharging charges stored in each of the capacitors by short-circuiting at a fault location in the switching element inside the inverter 13. The filter capacitor C0 stops discharging of the charges when the fuse 15 melts during the discharging process. Accordingly, only the charges in the filter capacitor C2 and a part of those in the filter capacitor C0 are discharged at the fault location with regard to discharging in the filter capacitors C2 and C0. As described above, the breakdown degree of the switching element is reduced.

In order to limit the high frequency component of a current generated in a vehicle, it is only required to connect the filter capacitor having a capacitance equal to or larger than the system demand capacitance between the DC terminals the inverter 13. The filter capacitor having a capacitance equal to or larger than the system demand capacitance is not necessary connected to the inverter 13 by the low inductance connection.

In order to reduce the surge voltage at interrupting of the switching element of the inverter 13, it is sufficient to connect the filter capacitor C2, which meets the interrupting-characteristic demand capacitance, between the DC terminals of the inverter 13 by the low inductance connection in the same manner as the above-described configuration. Moreover, in order to limit the high frequency component of a current generated in a vehicle, it is not required to connect filter capacitors to between the DC terminals of the inverter 13 by the low inductance connection.

According to the present embodiment, filter capacitors can be connected between the DC terminals of the inverter 13 by the low inductance connection to reduce electrical discharge energy to a fault location. Furthermore, filter capacitors meeting a system demand capacitance can be connected. Other embodiments of the apparatus for electric power conversion in electric rolling stock according to the present invention will be described. The same portions as those of the first embodiment will be indicated in the same reference numerals and their detailed description will be omitted.

Second Embodiment

Figure 2:
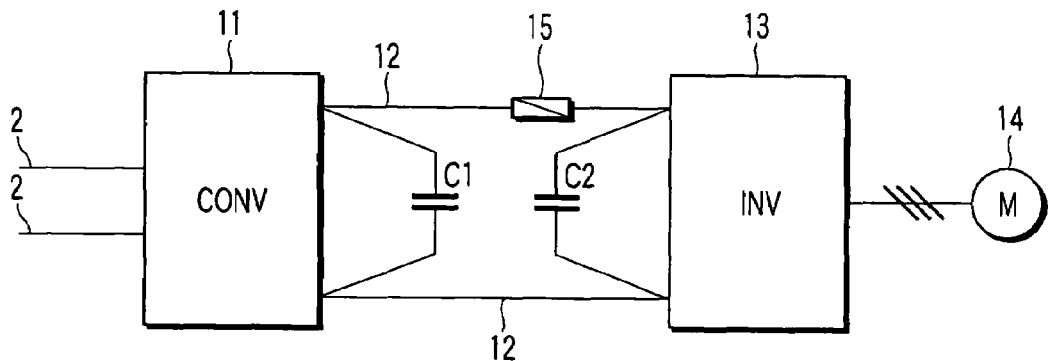
FIG. 2 is a block diagram of an apparatus for electric power conversion in electric rolling stock according to a second embodiment of the present invention.

FIG. 2 is a block diagram of an apparatus for electric power conversion in electric rolling stock according to a second embodiment of the present invention.

In the apparatus for electric power conversion in electric rolling stock according to the present embodiment, AC power fed through an AC catenary is converted into DC power, and the converted DC power is converted into the predetermined AC power to be supplied to the AC motor 14 which drives the electric rolling stock.

An AC power source 2 is connected to the AC catenary through a circuit breaker and a transformer. The AC power source 2 feeds AC power to a converter 11. The converter 11 converts the AC power fed from the AC power source 2 into the DC power. Though not shown, the converter 11 includes a switching element such as an IGBT and its peripheral components. The positive pole of a DC terminal in the converter 11 and that of a DC terminal in an inverter 13 are connected through a direct-current section (DC link section) 12, and the negative pole of a DC terminal in the converter 11 and that of a DC terminal in the inverter 13 are connected through a direct-current section (DC link section) 12. DC power converted in the converter 11 is input from the DC terminal of the converter 11 to the DC terminal of the inverter 13 through the DC link sections 12. Though not shown, the inverter 13 comprises a switching element such as an IGBT and its peripheral components in the same manner as the converter 11. In the inverter 13, DC power input from the converter 11 is converted into predetermined AC power, and the converted power is supplied to the AC motor 14 which drives electric rolling stock. Driving control of the AC motor 14 is performed by the AC power supplied from the inverter 13.

A filter capacitor C1 is connected between the DC terminals of the converter 11 by the low inductance connection. A filter capacitor C2 is connected between the DC terminals of the inverter 13 by the low inductance connection.

The fuse 15 is provided at the positive-pole side of the DC link sections 12. Moreover, the fuse 15 may be provided at the positive-pole side, the negative-pole side, or the both of the DC link sections 12. According to the above configuration, the filter capacitors C1 and C2 are connected to each other by the DC link section 12 through the fuse 15.

The filter capacitor C1 is provided in order to reduce a surge voltage at interrupting of the switching element in the converter 11. The filter capacitor C2 is provided in order to reduce a surge voltage at interrupting of the switching element in the inverter 13.

The filter capacitor C1 has a capacitance equal to or larger than an interrupting-characteristic demand capacitance of the switching element in the converter 11. The filter capacitor C2 has a capacitance equal to or larger than an interrupting-characteristic demand capacitance of the switching element in the inverter 13.

The filter capacitors C1 and C2 are provided to reduce DC voltage ripples generated on a voltage in a direct-current circuit (voltage of the filter capacitor). The DC voltage ripple has a frequency twice that of the AC power source 2. The total capacitance of the filter capacitors C1 and C2 is a capacitance equal to or larger than a capacitance required for reducing the DC voltage ripples (hereinafter, called "system demand capacitance"). This system demand capacitance is based on, for example, the power of the present apparatus for electric power conversion, the frequency and the voltage of the AC power source 2, the voltage of the DC circuit, and the like. Moreover, this system demand capacitance is determined, by considering, for example, that the DC voltage ripple is set to be within 10% of the voltage of the DC circuit.

A case in which the DC terminals are short-circuited by a fault in the switching element of the inverter 13 in the configuration will be explained.

The filter capacitors C1 and C2 start discharging charges stored in each of the capacitors by short-circuiting at a fault location in the switching element of the inverter 13. The filter capacitor C1 stops discharging of the charges when the fuse 15 melts during the discharging process. Accordingly, only the charges in the filter capacitor C1 and a part of those in the filter capacitor C2 are discharged at the fault location with regard to discharging in the filter capacitors C1 and C2. Thereby, the breakdown degree of the switching element in the inverter 13 is reduced.

Similarly, when the DC terminals are short-circuited by the fault of the switching element in the inverter 13, only the charges in the filter capacitor C1 and a part of those in the filter capacitor C2 are discharged at the fault location with regard to discharging in the filter capacitors C1 and C2. Accordingly, the breakdown degree of the switching element in the converter 11 is reduced.

According to the present embodiment, even in the apparatus for electric power conversion in electric rolling stock, in which the electric power is supplied through the AC catenary, filter capacitors can be connected between the DC terminals of the inverter by the low inductance connection, and filter capacitors can be connected between the DC terminals of the converter by the low inductance connection to reduce electrical discharge energy to a fault location. Moreover, filter capacitors meeting a system demand capacitance can be connected.

Third Embodiment

Figure 3:
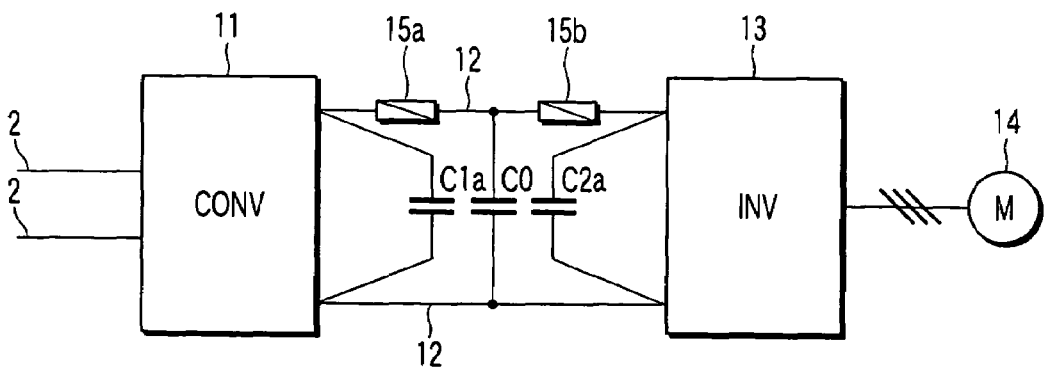
FIG. 3 is a block diagram of an apparatus for electric power conversion in electric rolling stock according to a third embodiment of the present invention.

FIG. 3 is a block diagram of an apparatus for electric power conversion in electric rolling stock according to a third embodiment of the present invention.

In the apparatus for electric power conversion in electric rolling stock according to the present embodiment, a filter capacitor C0 is added to the apparatus for electric power conversion for the electric rolling stock shown in FIG. 2. The filter capacitor C0 is connected between the side of the negative pole and the side of the positive pole in the DC link sections 12. Moreover, on the side of the positive pole of the DC link sections 12, a fuse 15a is connected at the side of a converter 11, and a fuse 15b is connected at the side of an inverter 13, assuming that connection points of the filter capacitor C0 and the DC link sections 12 are references. Furthermore, the fuses 15a and 15b may be provided at the positive-pole side, the negative-pole side, or the both of the DC link sections 12.

A filter capacitor C1a is connected between the DC terminals of a converter 11 by the low inductance connection. A filter capacitor C2a is connected between the DC terminals of the inverter 13 by the low inductance connection.

The filter capacitor C0 is connected to the converter 11 through the fuse 15a, and is connected to the inverter 13 through the 15b.

According to the present embodiment, the total capacitance of the filter capacitors C1a and C2a is smaller than the system demand capacitance. The filter capacitor C0 has at least a capacitance which is a difference between the total capacitance of the filter capacitors C1a and C2a and the system demand capacitance. That is, the total sum of the capacities of the filter capacitors C0, C1a, and C2a meets the system demand capacitance.

A case in which the DC terminals are short-circuited by the fault of the switching element in the inverter 13 in the above-described configuration will be explained.

The filter capacitors C0, C1a, and C2a start discharging charges stored in each of the capacitors by short-circuiting at a fault location in the switching element of the inverter 13. The filter capacitor C1a stops discharging of the charges when the fuses 15a and 15b melt during the discharging process of the filter capacitor C1a. The filter capacitor C0 stops discharging of the charges when the fuse 15b melts during the discharging process of the filter capacitor c0. Accordingly, only the charges in the filter capacitor C2a and a part of those in the filter capacitors C0 and C1a are discharged at the fault location with regard to discharging in the filter capacitors C0, C1a, and C2a. Accordingly, the breakdown degree of the switching element in the inverter 13 is reduced.

Similarly, when the DC terminals are short-circuited by the fault of the switching element in the converter 11, only the charges in the filter capacitor C1a and a part of those in the filter capacitors C0 and C2a are discharged at the fault location with regard to discharging in the filter capacitors C0, C1a, and C2a. Accordingly, the breakdown degree of the switching element in the inverter 11 is reduced.

According to the present embodiment, even when the electric power is supplied through an AC catenary, filter capacitors can be connected between the DC terminals of the inverter by the low inductance connection, and filter capacitors can be connected between the DC terminals of the converter by the low inductance connection to reduce electrical discharge energy to a fault location.

Moreover, even when the total capacitance of the filter capacitors C2a and C1a connected to the inverter 13 and the converter 11 does not meet the system demand capacitance, filter capacitors meeting the system demand capacitance can be connected by connecting the filter capacitor C0. For example, when the converter 11 and the inverter 13 are assumed to have a large capacitance in terms of the electric power, the capacitance of the filter capacitor C0 may be increased.

Fourth Embodiment

FIG. 4 is a block diagram of an apparatus for electric power conversion in electric rolling stock according to a fourth embodiment of the present invention.

The apparatus for electric power conversion in electric rolling stock according to the present embodiment has the same basic configuration as that of the apparatus for electric power conversion for the electric rolling stock shown in FIG. 2, and includes two or more converters, two or more inverters, or two or more converters and inverters. Moreover, FIG. 4 shows the apparatus for electric power conversion in electric rolling stock in which the converters and the inverters are not connected to one another by one-to-one connection. Two converters 11a and 11b, and three inverters 13a, 13b, and 13c are shown in FIG. 4.

In FIG. 4, filter capacitors (filter capacitors with a capacitance equal to or larger than an interrupting-characteristic demand capacitance) which decrease a DC voltage ripple are respectively provided for the converters 11a and 11b, and the inverters 13a, 13b, and 13c which are an electric power conversion section having a switching element. That is, the filter capacitor C11 is provided for the converter 11a, the filter capacitor C12 is provided for the converter 11b, and a filter capacitor C21 is provided for the inverter 13a, a filter capacitor C22 is provided for the inverter 13b, and a filter capacitor C23 is provided for the inverter 13c. Each of the filter capacitors C11, C12, C21, C22, and C23 is connected between the DC terminals of a corresponding electric power conversion section by the low inductance connection.

The total sum of the capacities of the filter capacitors C11, C12, C21, C22, and C23 meets the system demand capacitance.

The positive-pole sides of the DC terminals in the converters 11a and 11b and the positive-pole sides of the DC terminals in the inverters 13a, 13b, and 13c are connected through the DC link section 12. Similarly, the negative-pole sides of the DC terminals in the converters 11a and 11b and the negative-pole sides of the DC terminals in the inverters 13a, 13b, and 13c are connected through the DC link section 12.

A fuse 15A is provided between the positive-pole side of the DC link section 12 and the converter 11a. A fuse 15B is provided between the positive-pole side of the DC link section 12 and the converter 11b. A fuse 15C is provided between the positive-pole side of the DC link section 12 and the inverter 13a. A fuse 15D is provided between the positive-pole side of the DC link section 12 and the inverter 13b. And, the fuse 15E is provided between the positive-pole side of the DC link section 12 and the inverter 13c. Alternately, the fuses 15A, 15B, 15C, and 15D and 15E may be at the side of the positive pole in the DC link section 12, at the side of the negative pole in the DC link section 12, or both at the side of the positive pole in the DC link section 12 and at the side of the negative pole in the DC link section 12.

By the above configuration, the filter capacitor C11 is connected to the DC link section 12 through the fuse 15A; the filter capacitor C12 is connected to the DC link section 12 through the fuse 15B; the filter capacitor C21 is connected to the DC link section 12 through the fuse 15C; the filter capacitor C22 is connected to the DC link section 12 through the fuse 15D; and the filter capacitor C23 is connected to the DC link section 12 through the fuse 15E.

According to the present embodiment, the same effect as that of the second embodiment can be obtained even in the apparatus for electric power conversion in electric rolling stock in which the converters and the inverters are not connected to one another by one-to-one connection, wherein a number of converters and a number of inverters are not equal.

A similar effect can be obtained by adopting a similar configuration even when the number of the converters, or that of the inverters are changed.

Fifth Embodiment

Figure 5:
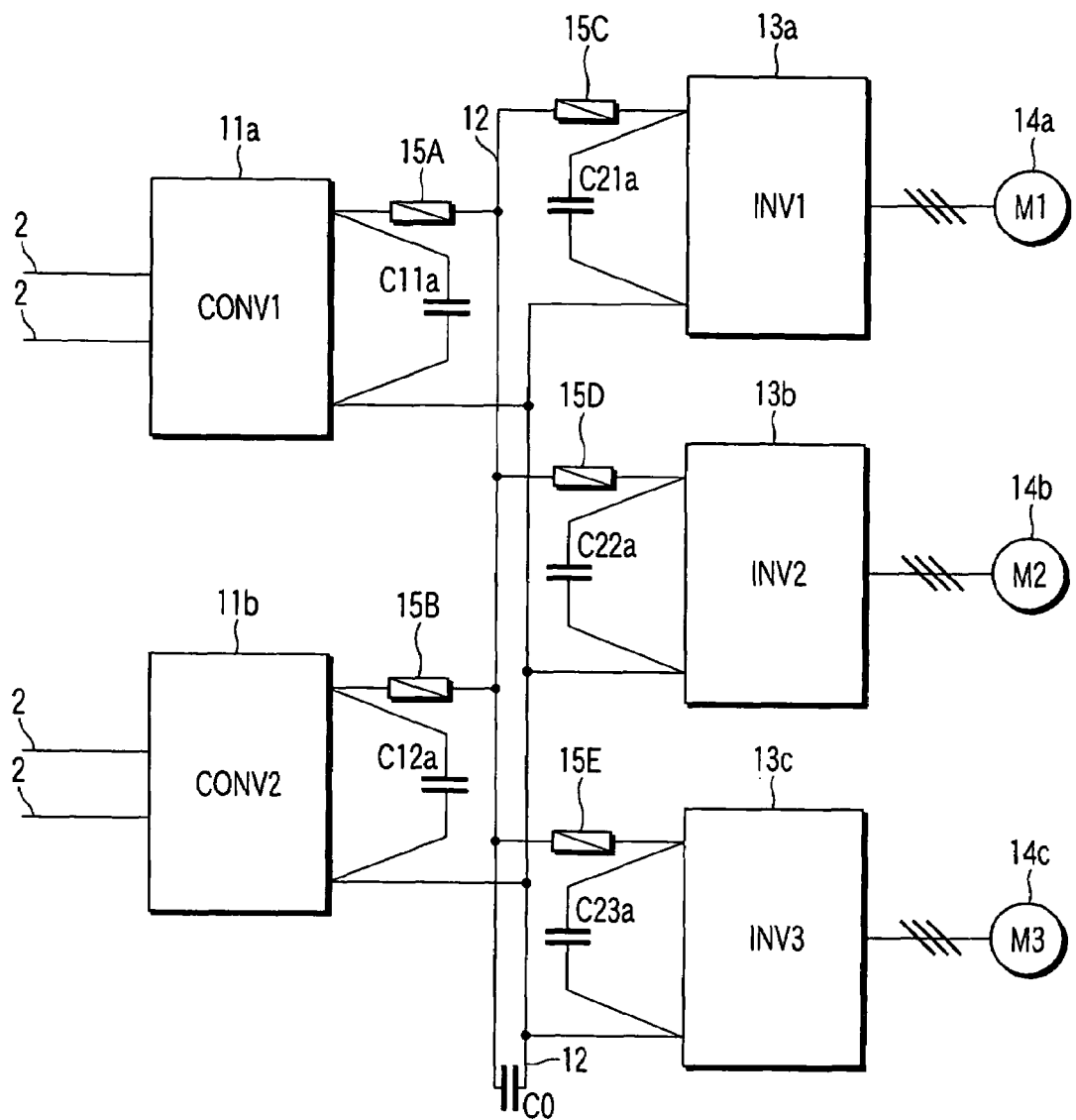
FIG. 5 is a block diagram of an apparatus for electric power conversion in electric rolling stock according to a fifth embodiment of the present invention.

FIG. 5 is a block diagram of an apparatus for electric power conversion in electric rolling stock according to a fifth embodiment of the present invention.

The apparatus for electric power conversion in electric rolling stock according to the present embodiment has a configuration which is different from that of the fourth embodiment shown in FIG. 4 in a point that the filter capacitor C0 is added and connected in the DC link sections 12.

A filter capacitor C11a is provided for the converter 11a, a filter capacitor C12a is provided for the converter 11b, and a filter capacitor C21a is provided for the inverter 13a, a filter capacitor C22a is provided for the inverter 13b, and a filter capacitor C23a is provided for the inverter 13c. Each of the filter capacitors C11a, C12a, C21a, C22a, and C23a is connected between the DC terminals of a corresponding electric power conversion section by the low inductance connection.

According to the present embodiment, the total capacitance of the filter capacitors C11a, C12a, C21a, C22a, and C23a is smaller than the system demand capacitance. The filter capacitor C0 has at least a capacitance which is a difference between the total capacitance of the filter capacitors C11a, C12a, C21a, C22a, and C23a; and the system demand capacitance. That is, the total sum of the capacities of the filter capacitors C11a, C12a, C21a, C22a, C23a, and C0 meets the system demand capacitance.

According to the present embodiment, the same effect as that of the third embodiment can be obtained even in the apparatus for electric power conversion in electric rolling stock in which the converters and the inverters are not connected to one another by one-to-one connection, wherein a number of converters and a number of inverters are not equal.

A similar effect can be obtained by adopting a similar configuration even when the number of the converters, or that of the inverters are changed.

Sixth Embodiment

Figure 6:
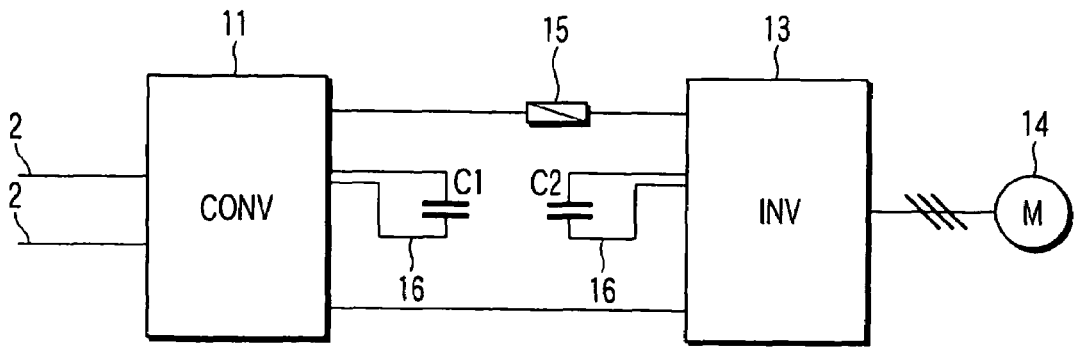
FIG. 6 is a block diagram of an apparatus for electric power conversion in electric rolling stock according to a sixth embodiment of the present invention.

FIG. 6 is a block diagram of an apparatus for electric power conversion in electric rolling stock according to a sixth embodiment of the present invention.

The apparatus for electric power conversion in electric rolling stock according to the present embodiment has a configuration which is different from that of the second embodiment shown in FIG. 2 in that the filter capacitor C1 and the converter 11 are connected through a thin conductor 16 with a wide area (plane-like conductor 16), or a laminated conductor 16, and the filter capacitor C2 and the converter 13 are connected through a thin conductor 16 with a wide area (plane-like conductor 16), or a laminated conductor 16.

The filter capacitor C1 is connected to the DC terminal of the converter 11 through the thin conductor 16, and the filter capacitor C2 is connected to the DC terminal of the inverter 13 through the thin conductor 16.

According to the present embodiment, a similar effect to that of the second embodiment can be obtained, and a smaller apparatus can be realized.

Moreover, even each of other embodiments can obtain the effect according to the present embodiment, in addition to that of each of the other embodiments by adopting the same configuration as that of the present embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for electric power conversion in an electric rolling stock, comprising:
    an inverter which receives a DC power fed from a DC power source at DC terminals, converts the received DC power into an AC power, and supplies the AC power to an AC motor;
    a first capacitor connected to the DC terminals of the inverter by low inductance connection and reduces a surge voltage generated in the inverter; and
    a second capacitor connected to the DC terminals of the inverter through a fuse in series, the second capacitor being in parallel to the first capacitor, the first capacitor being in parallel to the fuse,
    wherein a total sum of capacitance of the first and the second capacitors is equal to or larger than a system demand capacitance.

2. The apparatus according to claim 1,
    wherein the first capacitor is connected between the DC terminals of the inverter by low inductance connection, using a laminated conductor.

* * * * *